Jan. 13, 1925.
G. D. SUNDSTRAND
STEADY REST
Filed Sept. 10, 1919
1,523,310
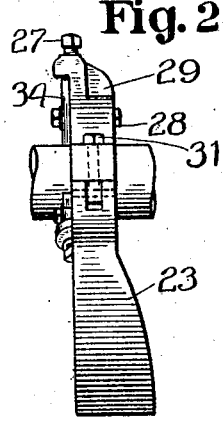
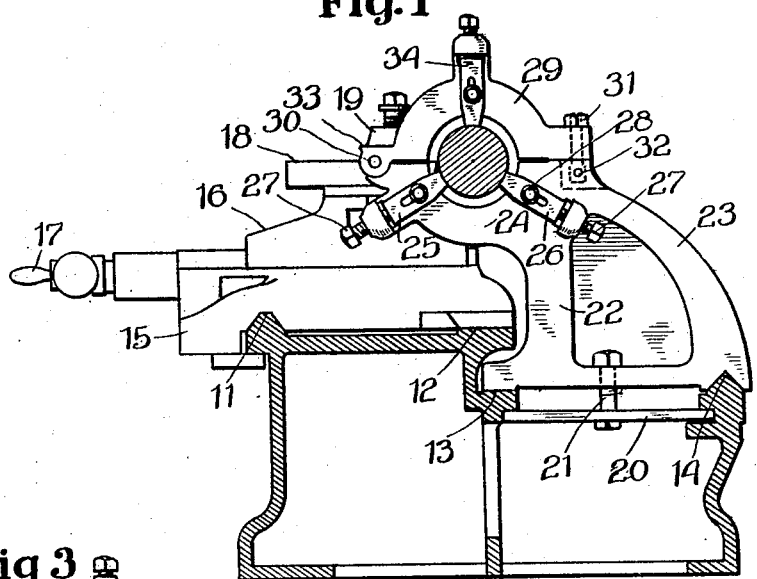
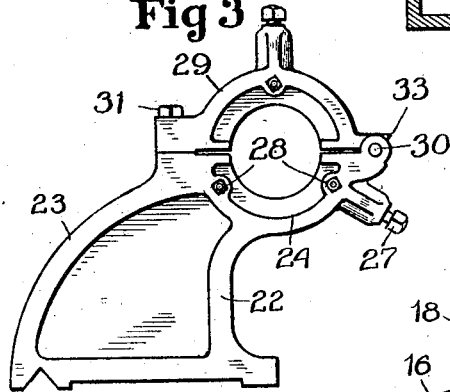
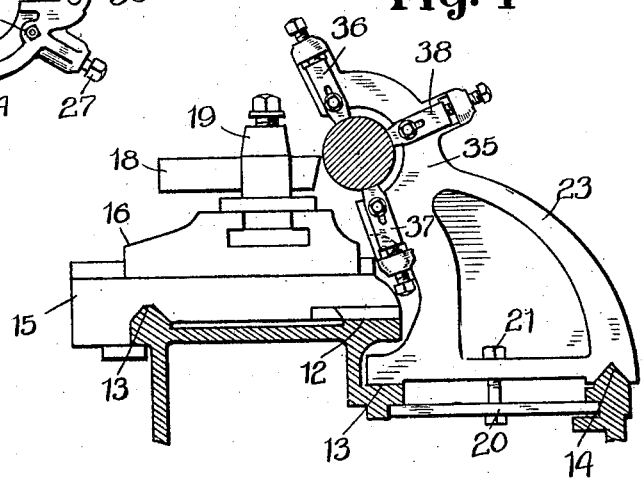
Inventor
Gustaf D. Sundstrand
By Miller Chindahl & Parker,
Attys Patented Jan. 13, 1925.

1,523,310

UNITED STATES PATENT OFFICE.

GUSTAF DAVID SUNDSTRAND, OF ROCKFORD, ILLINOIS, ASSIGNOR TO ROCKFORD TOOL COMPANY, OF ROCKFORD, ILLINOIS, A CORPORATION OF ILLINOIS.

STEADY REST.

Application filed September 10, 1919. Serial No. 322,816.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Steady Rests, of which the following is a specification.

My invention relates to equipment for lathes and more specifically to an improved steady rest particularly adapted for use on lathes having a plurality of sets of ways, such, for instance, as the type illustrated in my copending application Serial No. 212,393, filed Jan. 18, 1918 (Patent No. 1,325,424, dated December 16, 1919).

One object of my invention is to provide a cheap and serviceable steady rest for this type of lathe.

Another object is to provide a steady rest past which the front tool carriage may be moved without removing or adjusting the steady rest or its adjustment on the work.

Still another object is to provide a rest past which not only the tool carriage but all the parts carried thereby including the tool, mounted in operative position and taking a cut off the material, may be moved without disturbing or adjusting either the work or the steady rest.

The steady rests in common use are mounted either on the same ways as the tool carriage or on ways so located that the body of the rest completely blocks movement of the tool carriage past the rest. In using steady rests of this type, it is necessary to machine half the piece of stock and then dismount either the rest or the stock, taking the rest off the lathe while turning the stock end for end, or sliding the tool carriage past the center and then replacing the rest.

In the accompanying drawings, Fig. 1 is an end view of one type of steady rest according to my invention mounted on a double bed showing a front tool carriage adapted to be moved past the same.

Fig. 2 is a rear elevation of the tool rest shown in Fig. 1, and Fig. 3 an end view from the opposite end from that shown in Fig. 1.

In Fig. 4, I have illustrated another embodiment of my invention in which the parts are so arranged that a continuous cut from end to end of a piece of stock may be taken by the tool on the front tool carriage without interfering with the steady rest.

Referring to Figs. 1 and 3, inclusive, the lathe bed 10 has a pair of front ways 11 and 12 and rear ways 13 and 14. The ways 12 and 13 are located approximately directly under the center line of the lathe. The advantages of this type of construction have been fully disclosed in my copending application above referred to, and need not be herein set forth in detail. The front tool carriage 15, of any common or preferred construction is slidably mounted on the front ways 11 and 12, and as illustrated, carries the usual transverse slide 16 operated by the handle 17 which in turn carries the tool 18 clamped in a suitable tool post 19.

My improved steady rest is mounted on the rear ways 13 and 14 and may be clamped in longitudinal adjusted position on said ways by suitable means such as the clamping plate 20 and bolt 21. The body of the steady rest comprises a web reinforced by the vertical flange 22 extending upwardly clear of the front carriage 15 in its motion along the bed, and the curved flange 23 rising from approximately above the rear way 14 and extending upwardly and inwardly to unite with the vertical flange 22 in the stationary head 24.

The head 24 may carry any suitable or preferred means for engaging the work to steady and guide it. I have illustrated two slidable rest jaws 25 and 26 adapted to move along radial lines extending through the center line of the machine and spaced approximately 120 degrees apart, and means for adjusting them comprising adjusting screws 27 and clamping screws 28. A cap member 29 is pivoted to the stationary head 24 at 30 and may be held in the position illustrated in Fig. 1 by a suitable bolt 31 or released by swinging said bolt around its pintle 32, and thrown back to allow the work to be removed. A suitable shoulder 33 near the pivotal mounting of the cap 29 is adapted to hold it when thrown back, in approximately vertical position. The cap 29 carries the rest jaw 34 similar to the jaws 25 and 26, already described, and located vertically over the work as clearly shown in Fig. 1.

It will be apparent that the portion of the work on one side of the steady rest shown in Fig. 1, may be machined and that by drawing the transverse slide 16 away from the work the carriage may be moved past the steady rest to machine the portion of the work on the other side, the jaw 25 being so disposed relative to the line of cut on the front of the work that there is no difficulty in running the tool in alongside the rest.

In Fig. 4 I have illustrated another embodiment of my invention mounted on the ways 13 and 14 as in Fig. 1. The head 35 illustrated in Fig. 4 extends as shown from a point below and slightly back of the center line of the lathe to a point above and slightly in front of said center line and at its two extremities carries the rest jaws 36 and 37, similar to those already described. These jaws as clearly illustrated are spaced less than 180 degrees apart measuring from the jaw 36 around the front of the work to the jaw 37. They will therefore steady the work against forward displacement, but, as clearly illustrated, the space in front of the work through which the front tool carriage 15, slide 16 and tool 18 carried thereby move in sliding along the bed is entirely unobstructed. A third rest jaw 38 is carried by the head 35, being approximately centrally spaced intermediate the jaws 36 and 37 to complete the mounting.

In using the embodiment of my invention illustrated in Fig. 4, the section of the piece of stock to which the rest is to be applied should first be turned to a slightly smaller diameter than the intended final diameter of the adjacent portions. This difference in diameter need only be one or two thousandths of an inch. The rest is then mounted in position and properly adjusted on the work and the entire shaft or piece of stock may be machined from end to end to exact size. This makes it possible to finish the portions of the shaft on opposite sides of the rest to the same diameter with much greater speed and precision than would be possible if one end had to be finished and the other end subsequently machined to the same size. In a vast majority of cases the work is such that the very slight decrease in diameter over the portion where the steady rest is to be mounted is entirely immaterial.

While I have illustrated and described in detail two specific embodiments of my invention it should be clearly understood that the description is only for purposes of illustration, that tool rests according to my invention may be mounted on other and radically different types of lathe beds from that which I have selected for the purpose of this disclosure and that many modifications and variations will naturally occur to those skilled in the art. I aim in the subjoined claims to cover all such legitimate modifications and variations.

I claim as my invention:

1. In a lathe, in combination, a tool carriage slidable longitudinally the length of the work in the lathe, a steady rest primarily V-shaped, the legs of the V arranged one over and one under the inner side of the tool carriage, whereby the tool carriage is slidable past the steady rest, the under leg of said V-shaped rest being the base of the steady rest, the upper leg of said V-shaped rest having at its extremity a U-shaped member, the legs of said U-shaped member being one over and one under the work piece, whereby the tool is slidable past the steady rest, each leg and the body of the U-shaped member carrying an adjustable jaw for steadying the work, and a supporting member from the extremity of the upper leg to the lower leg of the V-shaped rest at a point intermediate the length of said lower leg.

2. In a lathe, in combination, an adjustable steady rest, supporting ways for the steady rest, and clamping means between said steady rest and said ways, the steady rest comprising a horizontal base-plate, upwardly extending webs from said base-plate, said webs meeting to form a head located substantially vertically over one of the ways, said head carrying adjustable jaws for steadying the work.

3. In a lathe, in combination, a bed, a headstock and a tailstock for holding the work therebetween, a tool carriage, and a pair of parallel ways in the bed for supporting the tool carriage, one of said ways being located substantially under the line of centers of the lathe, the other way being the foremost in the bed whereby the maximum width between the ways is obtained, a steady rest for the work slidably adjustable longitudinally of the work, clamping means for holding said rest immovable, a second pair of parallel ways in the bed for supporting the steady rest, said pair of ways being below the level of the first pair, one of said ways being rearmost of the bed, the other way being substantially under the line of centers of the lathe and directly beneath the corresponding way of the first pair, whereby the maximum width between the second pair of ways is obtained.

In testimony whereof, I have hereunto set my hand.

GUSTAF DAVID SUNDSTRAND.